Patented Dec. 27, 1932                                              1,892,123

UNITED STATES PATENT OFFICE

WILLIAM F. ZIMMERLI, OF FAIRLAWN, AND ROBERT S. HAVENHILL, OF AKRON, OHIO, ASSIGNORS TO THE B. F. GOODRICH COMPANY, OF NEW YORK, N. Y., A CORPORATION OF NEW YORK

ADHESIVE COMPOSITION AND METHOD OF MAKING SAME

No Drawing.                Application filed April 12, 1928. Serial No. 269,601.

This invention relates to adhesive compositions and particularly to plastic adhesive compositions which permanently retain their tack and plasticity upon extended exposure and to methods of making such adhesives.

The purpose of the present invention is to impart to reclaimed rubber a permanent plasticity and to increase materially its adhesive power by giving to it a longer "tooth" than had been heretofore possible with adhesives having a rubber base.

Briefly, the invention consists in fluxing reclaimed rubber with certain resins in such manner as to form extremely tacky and permanently plastic compositions of soft smooth uniform texture. Such tacky and permanently plastic compositions may be made by fluxing reclaimed rubber produced by any of the ordinary and commercial methods from tire casings, inner tubes, boots and shoes and mechanical goods, and hereafter generally referred to as "reclaimed rubber", with ester gum or similar resin, such as rosin, paracoumarone, manila copal and the like, hereinafter for convenience referred to collectively as "resin gums". This may be accomplished by placing the two constituents into an internal mixer and masticating with or without application of heat, the heat of mixing being sufficient to effect the fluxing which may nevertheless be accelerated by an external application of heat. It is to be understood, however, that the fluxing of the two constituents may be carried out on a regular rubber mill or even in an open vessel.

The plastics thus formed are miscible with so-called rubber solvents in all proportions, such solvents as gasoline, benzol, carbon tetrachloride being particularly satisfactory and mixtures of these with acetone or other resin gum solvents preferably in proportions not in excess of ½ resin gum solvent have been generally found to give the most satisfactory results.

The plastics of this application have the capacity for admixing with large quantities of the rubber compounding ingredients, particularly pulverulent pigments like clays, gas black, pulverulent metallic oxides, etc., and softeners like pine tar oil, linseed oil, castor oil, asphaltums, etc.

In one embodiment of our invention, inner tube reclaim, 400 parts by weight, is placed in a masticator and ground resins of equal weight slowly added thereto, the mastication being continued until a soft, smooth tacky dough is formed. This dough is suitable for certain uses as an adhesive but because of the difficulty of spreading it in thin films, it is preferable for certain purposes to dissolve it in a quick-drying solvent. To do this, the dough is preferably placed in a cement churn and 200 parts by weight of gasoline and 100 parts of acetone are admixed therewith. This forms a heavy viscous but readily spreadable composition which, when formed into films or coatings and the solvent removed by evaporation, is as tacky and permanently plastic as the original dough from which it was made. It is this unusual property of the adhesive compositions of this application to retain their tack and plasticity, as well as their high adhesive strength, which gives to them their unusual value for a large number of purposes. Increased quantities of solvents may be added if desired.

In another embodiment, whole tire reclaim is broken down on a rubber mill and then placed in an internal mixer, and an equal weight of ground ester gum is slowly added and the two admixed until there is a complete fluxing of the two materials. This forms a soft smooth dough. Where compounding ingredients are to be added, softeners are preferably added with the resins and pulverulent pigment after the plastic dough has been formed, or even after the dough has been dissolved or dispersed in organic solvents. It is to be understood, however, that all these compounding ingredients may be added at any stage in the process of preparation. Thus, one recipe which has given very satisfactory results calls for pine tar in an amount equal to one-fifth the weight of the reclaim, and an anti-oxidant such as aldol-alpha-naphthylamine in an amount equal to one-fiftieth the weight of the reclaim, to be incorporated with the batch along with the resin gum. The plastic dough thus formed is then dissolved in a mixed organic solvent, in an amount substantially equal in weight to the reclaim content, and consisting of two parts gasoline and one part acetone. Pigments, such as clay, blanc fixe, whiting, carbon black, etc., are now added to the dissolved plastic in such quantities as may be desired to form a viscous mass of desired consistency. Materials of the consistency of fresh putty are useful as waterproof plastic fillers and sealing compounds and have the unusual property of retaining their plasticity over extended periods.

While in the above specific examples, the reclaimed rubber and resin gum have been employed in equal parts, the proportions may be widely varied, 50 to 200 parts by weight of reclaimed rubber to 100 parts of resin gum having been found to give satisfactory products.

Numerous variations and modifications in the procedure hereinabove set forth may be made without departing from the invention hereof, it being particularly understood that incorporation with the plastic hereof of other materials, whether pulverulent, amorphous, or liquid, either during or after the preparation of the plastic are contemplated and comprehended within the scope of this invention.

We claim:

1. The herein described method of making a spreadable adhesive composition which comprises dispersing in reclaimed rubber a resin gum in amounts substantially within the range of 50 to 200 parts of reclaimed rubber to 100 parts of resin gum until a smooth end-product is produced, and thereafter reducing the viscosity of the mass to desired consistency by the addition of organic solvents.

2. The herein described method of making a spreadable adhesive composition which comprises dispersing in reclaimed rubber ester gum in amounts substantially within the range of 50 to 200 parts of reclaimed rubber to 100 parts of ester gum until a smooth product is produced, and thereafter reducing the viscosity of the mass to desired consistency by the addition of organic solvent comprising a rubber solvent and a resin solvent.

3. A spreadable composition composed of a plastic dough comprising reclaimed rubber and ester gum intimately admixed to form a dough of higher plasticity than either of its constituents and dispersed in an organic solvent.

4. A spreadable composition composed of a plastic dough comprising reclaimed rubber and a resin gum intimately admixed to form a dough of higher plasticity than either of its constituents the latter being present in amounts substantially within the range of 50 to 200 parts by weight of reclaimed rubber to 100 parts of resin gum, said dough being dispersed in an organic solvent.

5. A spreadable composition composed of a plastic dough comprising reclaimed rubber and ester gum intimately admixed to form a dough of higher plasticity than either of its constituents, the latter being present in amounts substantially within the range of 50 to 200 parts by weight of reclaimed rubber to 100 parts of the ester gum, said dough being dispersed in organic solvent of the class comprising gasoline, carbon-tetrachloride, acetone or mixtures thereof.

In witness whereof we have hereunto set our hands this 9th day of April, 1928.

WILLIAM F. ZIMMERLI.
ROBERT S. HAVENHILL.